US008151213B2

(12) United States Patent  
Weitzman et al.

(10) Patent No.: US 8,151,213 B2  
(45) Date of Patent: Apr. 3, 2012

(54) SYSTEM, METHOD AND PROGRAM PRODUCT FOR TABULAR DATA WITH DYNAMIC VISUAL CELLS

(75) Inventors: Louis M. Weitzman, Brookline, MA (US); Alister Lewis-Bowen, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1760 days.

(21) Appl. No.: 11/089,734

(22) Filed: Mar. 25, 2005

(65) Prior Publication Data

US 2006/0218483 A1    Sep. 28, 2006

(51) Int. Cl.  
*G06F 3/048* (2006.01)

(52) U.S. Cl. .......................... 715/815; 715/810

(58) Field of Classification Search ................ 715/500, 715/503, 504, 815, 904  
See application file for complete search history.

(56) References Cited

U.S. PATENT DOCUMENTS

| | | | | |
|---|---|---|---|---|
| 5,093,907 A | | 3/1992 | Hwong et al. ............... 395/152 |
| 5,231,577 A | * | 7/1993 | Koss ............................. 715/504 |
| 5,255,363 A | * | 10/1993 | Seyler .......................... 715/526 |
| 5,416,895 A | | 5/1995 | Anderson et al. ........... 395/148 |
| 5,461,708 A | | 10/1995 | Kahn ............................. 395/140 |
| 5,502,805 A | | 3/1996 | Anderson et al. ........... 395/148 |
| 5,535,324 A | * | 7/1996 | Alvarez et al. ............... 715/503 |
| 5,581,678 A | | 12/1996 | Kahn ............................. 395/140 |
| 5,721,847 A | * | 2/1998 | Johnson ........................ 715/786 |
| 5,880,742 A | * | 3/1999 | Rao et al. ...................... 345/440 |
| 6,134,564 A | * | 10/2000 | Listou .......................... 715/505 |
| 6,138,130 A | * | 10/2000 | Adler et al. .................. 715/503 |
| 6,185,582 B1 | * | 2/2001 | Zellweger et al. ............ 715/503 |
| 6,256,649 B1 | | 7/2001 | Mackinlay et al. .......... 707/503 |
| 6,415,305 B1 | * | 7/2002 | Agrawal et al. .............. 715/503 |
| 6,496,832 B2 | * | 12/2002 | Chi et al. ...................... 707/102 |
| 6,691,281 B1 | * | 2/2004 | Sorge et al. .................. 715/503 |
| 7,107,519 B1 | * | 9/2006 | Webster et al. .............. 715/503 |
| 7,127,672 B1 | * | 10/2006 | Patterson et al. ............ 715/503 |
| 2002/0091728 A1 | | 7/2002 | Kjaer et al. .................. 707/503 |
| 2005/0044486 A1 | * | 2/2005 | Kotler et al. ................. 715/503 |
| 2006/0080594 A1 | * | 4/2006 | Chavoustie et al. ......... 715/503 |

OTHER PUBLICATIONS

Torres, Spreadsheet Data Visualization, Research Disclosure n334 02-92 p. 4 (Feb. 1992).

* cited by examiner

*Primary Examiner* — William Bashore  
*Assistant Examiner* — David Phantana Angkool  
(74) *Attorney, Agent, or Firm* — John E. Campbell; Floyd A. Gonzalez (57) ABSTRACT

An apparatus, method and program product for providing dynamic visual cells in tabular data. A computer has an application for selecting a range of cells in said tabular data. A routine within the application recognizes a request for a graphical plot for data contained within the selected range of cells. The request may be from a user via a popup or a command menu. A routine within the application provides a graphical plot in a summary cell associated with the selected range of cells. The summary cell may be associated with the selected range of cells by being proximate the selected range of cells, or by location, color or a graphic property.

18 Claims, 9 Drawing Sheets

SYSTEM, METHOD AND PROGRAM PRODUCT FOR TABULAR DATA WITH DYNAMIC VISUAL CELLS

This invention relates to tabular data applications executable by a computer, and particularly to dynamically visualizing the results of calculations and plots to a visually-based spreadsheet where cells of the spreadsheet contain image data.

BACKGROUND OF THE INVENTION

There are two common functions across a set of data of a spreadsheet: applying formulas and automatically rendering plots. These actions are typical of numeric-based spreadsheets. Applying a formula across a series of rows or columns (or arbitrary cells) results with a numeric value being placed in another cell. This other cell is typically at the end of the row or column. Selecting an adjacent set of cells and automatically rendering a plot of these values against the x-axis is another common task. The resulting plot will either appear within a separate pane/window over the data cells with which you are working. This interaction results in the obscuring of the original data.

U.S. Pat. No. 5,093,907 issued Mar. 3, 1992 to Hwong et al. for GRAPHIC FILE DIRECTORY AND SPREADSHEET discloses a combined visual directory and spreadsheet for graphic files. Graphic files can be selectively associated with cells of a matrix. A selectable portion of the matrix containing miniaturized versions of the graphic files associated with the cells of that portion is displayed on an editing monitor. Graphic functions of various kinds can be assigned to displayed cells by the operator to produce modifications, animation, or display of graphics associated with selected cells.

U.S. Pat. No. 5,255,363 issued Oct. 19, 1993 to Seyler for GRAPH-BASED PROGRAMMING SYSTEM AND ASSOCIATED METHOD discloses a graphical programming system with a spreadsheet base for enabling users to create graphical program for displaying and manipulating data.

U.S. Pat. No. 5,416,895 issued May 16, 1995 to Anderson et al. for SYSTEM AND METHODS FOR IMPROVED SPREADSHEET INTERFACE WITH USER-FAMILIAR OBJECTS and U.S. Pat. No. 5,502,805 issued Mar. 26, 1996 to Anderson et al. for SYSTEM AND METHODS FOR IMPROVED SPREADSHEET INTERFACE WITH USER-FAMILIAR OBJECTS disclose electronic spreadsheet systems which include a notebook interface having a plurality of notebook pages, and methods for rapidly accessing and processing information on different pages.

U.S. Pat. No. 5,462,708 issued Oct. 24, 1995 to Kahn for SYSTEMS AND METHODS FOR AUTOMATED GRAPHING OF SPREADSHEET INFORMATION and U.S. Pat. No. 5,581,678 issued Dec. 3, 1996 to Kahn for SYSTEM AND METHODS FOR AUTOMATED GRAPHING OF SPREADSHEET INFORMATION disclose electronic spreadsheet systems which include intelligent graphing modules for automatically selecting a graph type based on a user's own data.

U.S. Pat. No. 5,880,742 issued Mar. 9, 1999 to Rao et al. for SPREADSHEET IMAGE SHOWING DATA ITEMS AS INDIRECT GRAPHICAL REPRESENTATIONS discloses an improvement to a spreadsheet application program and displays a first spreadsheet image showing a plurality of cell regions each of which shows a direct, symbolic representation of a source data value of a source data item in an n-dimensional information data array with which the cell is respectively paired. A second spreadsheet image is displayed which shows in each cell, a graphical display object representation of the respectively paired source data value in place of its direct representation.

U.S. Pat. No. 6,256,649 B1 issued Mackinlay et al. issued Jul. 3, 2001 for ANIMATED SPREADSHEET FOR DYNAMIC DISPLAY OF CONSTRAINT GRAPHS displays an augmented spreadsheet presentation provides for selecting a region of user focus in a primary body of data displayed as an array of cells, with two or more displayed cells of the array of cells being logically linked by a constraint graph.

U.S. Pat. No. 6,496,832 B2 issued Dec. 17, 2002 to Chi et al. for VISUALIZATION SPREADSHEET discloses a system for analyzing data organized into data sets and for transforming the data sets into a visual representation of the data sets.

U.S. patent application Publication published Jul. 11, 2002 by Kjaer et al. for MULTIDIMENSIONAL ELECTRONIC SPREADSHEET SYSTEM AND METHOD discloses a multidimensional electronic spreadsheet system wherein different spreadsheet cells may be addressed by a different number of variables, thereby minimizing memory and processing time requirements of the electronic spreadsheet system.

Torres, for SPREADSHEET DATA VISUALIZATION, Research Disclosure n334 02-92 page 4, and (Feb. 1992) discloses a technique to enhance processing of spreadsheet or tabular data by creating a visual spreadsheet and includes automatic generation of a visual spreadsheet by converting numeric data to visual form as in a 3-D histogram.

SUMMARY OF THE INVENTION

The shortcomings of the prior art are overcome and additional advantages are provided through the provision of a system, method and program product which visualize the results of calculations and plots, and applying the techniques to a visually-based spreadsheet where the cells contain numeric or image data.

It is an object of the present invention to plot the output of a calculation over a set of data.

It is also an object of the present invention to provide a representation within the viewed spreadsheet but which is contained as a meaningful image within a cell that does not distract from or hides the existing data with which it is working.

It is further an object of the present invention to provide images which are used as input to functions. The output of the function is other images or plots which change over time.

It is also an object of the present invention to provide images in a visual spreadsheet in which an analysis is run on a row of images and a plot of the results appears at the end of the row.

It is also an object of the present invention to present a graphic summary for each cell or a selected region of cells in a sequence of cells.

It is also an object of the present invention to provide summary data presented overlaying cell data. The summary data can be textual, numeric or image data of a sequence of cells with the final summary cell displaying text, numbers, graphs or images.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
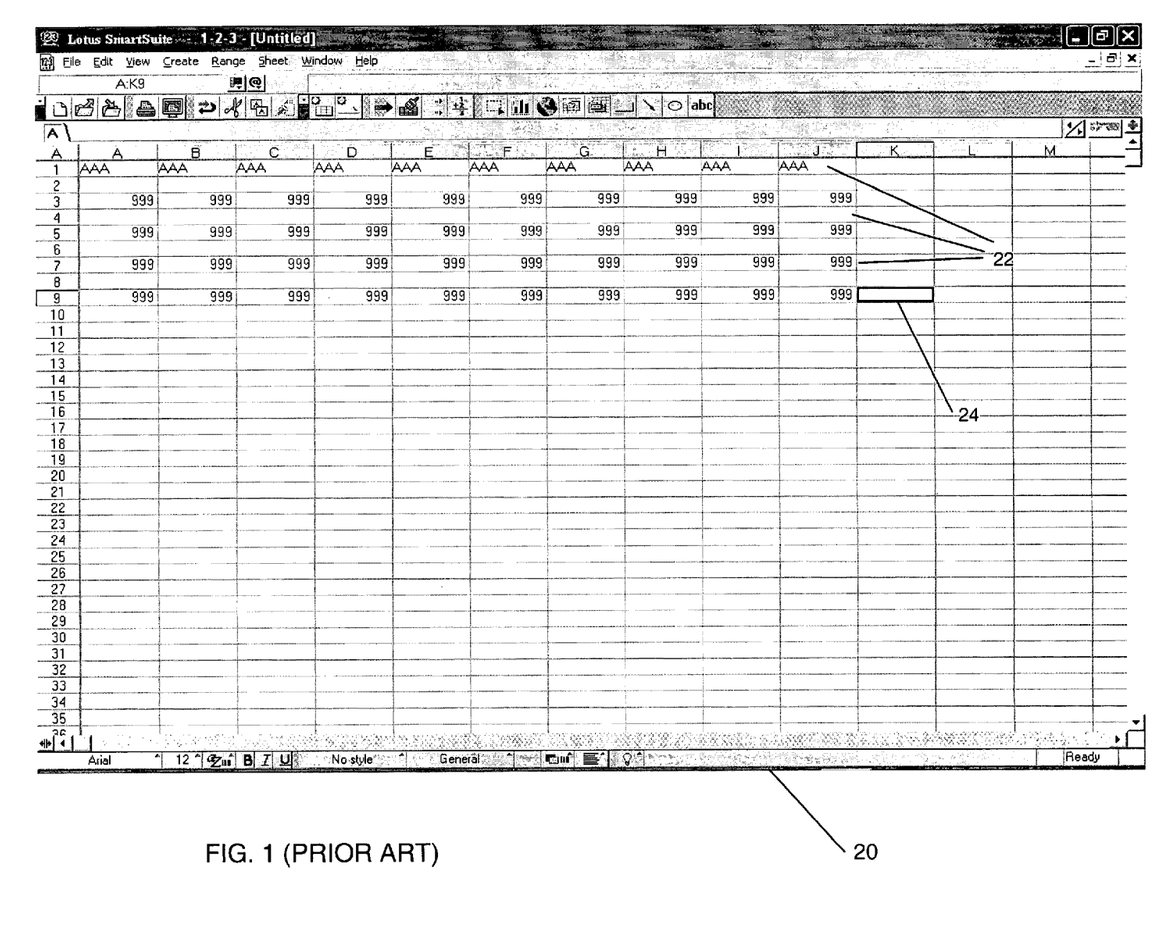
FIG. 1 illustrates a screen capture of a prior art spreadsheet of a plurality of cells arranged in rows and columns.

FIG. 1 illustrates a prior art screen capture 20 of a spreadsheet application such as 1-2-3 from Lotus and having a plurality of cells 22 arranged in rows 1-36 and columns A-M. As is well known, each cell 22 may contain alphabetic characters illustrated by AAA, or numeric characters illustrated by 999, or a combination of both. The characters are inputted into or modified in selected cells by use of a curser icon 24, or calculated from data in other cells, as is known. The present invention allows a user to create summary visualizations and annotated data within a cell of the spreadsheet, as will be described.

Figure 2:
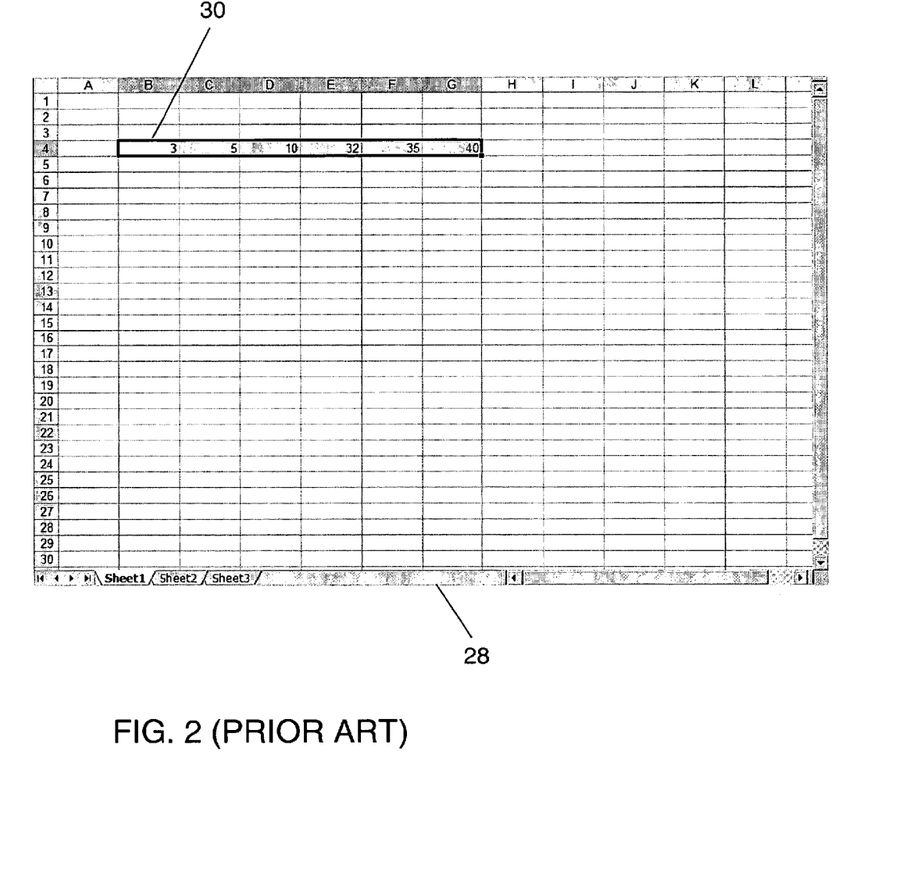
FIG. 2 illustrates a prior art spreadsheet in which a row of cells contain data.
Figure 3:
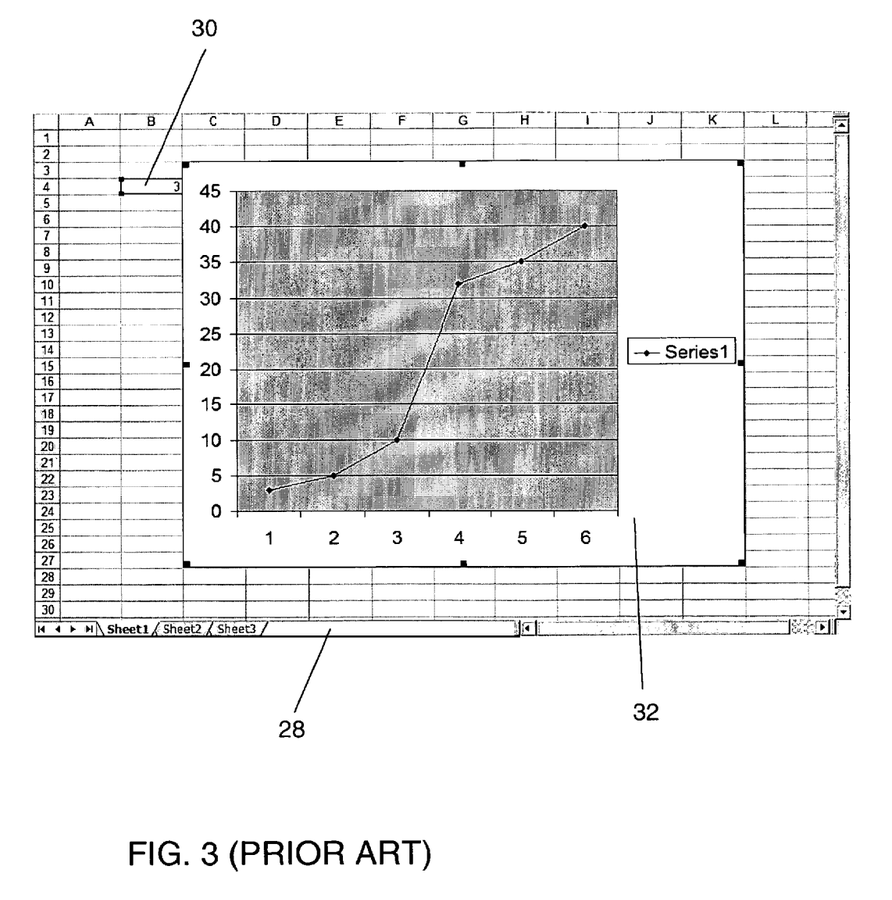
FIG. 3 illustrates a prior art spreadsheet application in which a plot of the data in the row of FIG. 2 is overlaid over the spreadsheet, obscuring the original sheet.
Figure 4:
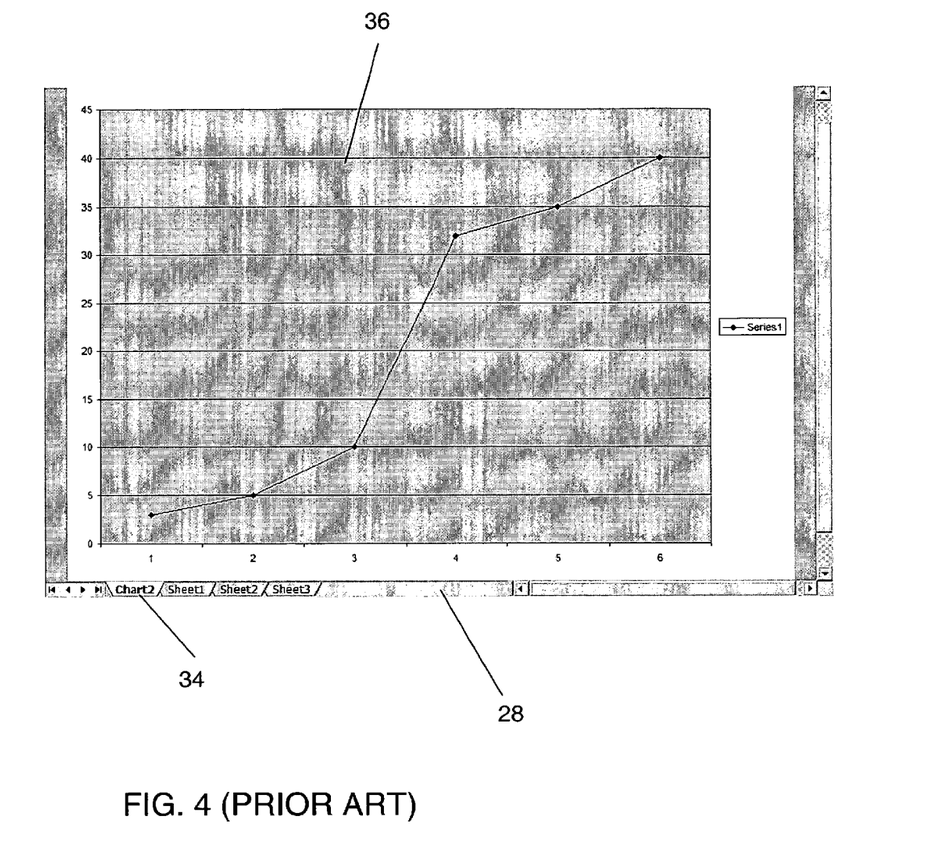
FIG. 4 illustrates a prior art chart in a spreadsheet application in which the plot of FIG. 3 is shown in a separate sheet.

FIG. 2 is illustrates a prior art spreadsheet sheet 28 having a row of cells 30 containing data in the cells B:4 to G:4. One of the typical spreadsheet functions is to plot the data in row 30, and display it in a chart 32 shown in FIG. 3 which overlays the original sheet 28, obscuring at least a portion of the row 30. Another typical function of prior art spreadsheet applications is to create a separate sheet 34 in FIG. 4 which is a chart 36 plotting the contents of the row 30. Although the chart 36 does not obscure the row 30 as in FIG. 3, the plot of the chart 36 cannot be viewed at the same time that the row 30 is viewed.

Figure 5:
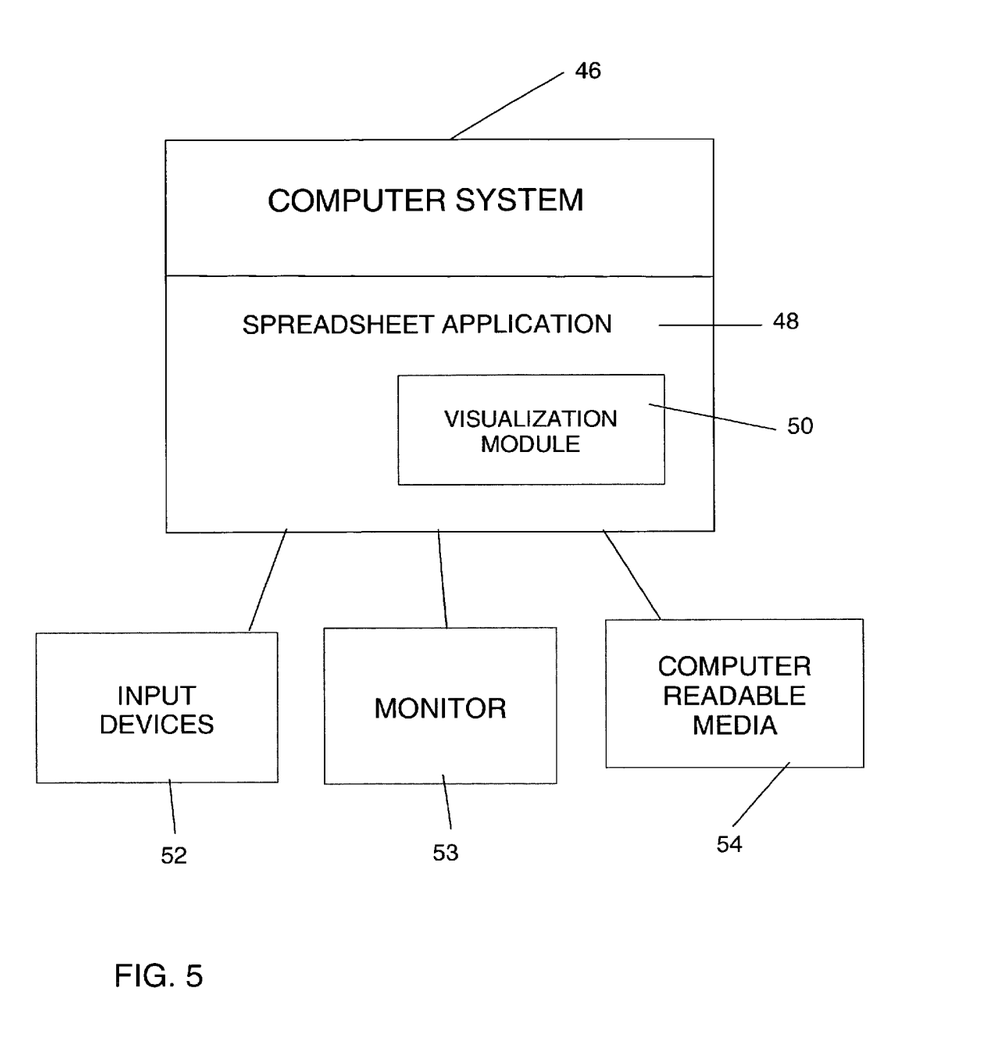
FIG. 5 is a block diagram of a computer system including a spreadsheet application having a visualization module of the present invention.

FIG. 5 is a block diagram of a computer system 46 usable with the present invention. The computer system 46 includes a spreadsheet application 48 being executed by the computer system 46. The spreadsheet application 48 includes a visualization module 50 for creating summary and annotated visualizations. The computer 46 additionally includes input devices 52 for inputting data into the cells of row 30, as previously discussed. The computer system 46 further includes a monitor 53 for displaying the spreadsheet of FIG. 1, visualization displays of the visualization module 50, and a computer readable media 54 for storing computer readable code for the spreadsheet application 48 for data used in the application. The computer readable media 54 may include computer RAM, ROM, hard drive, disk, diskette, tape, other electronic or optic media.

Figure 6:
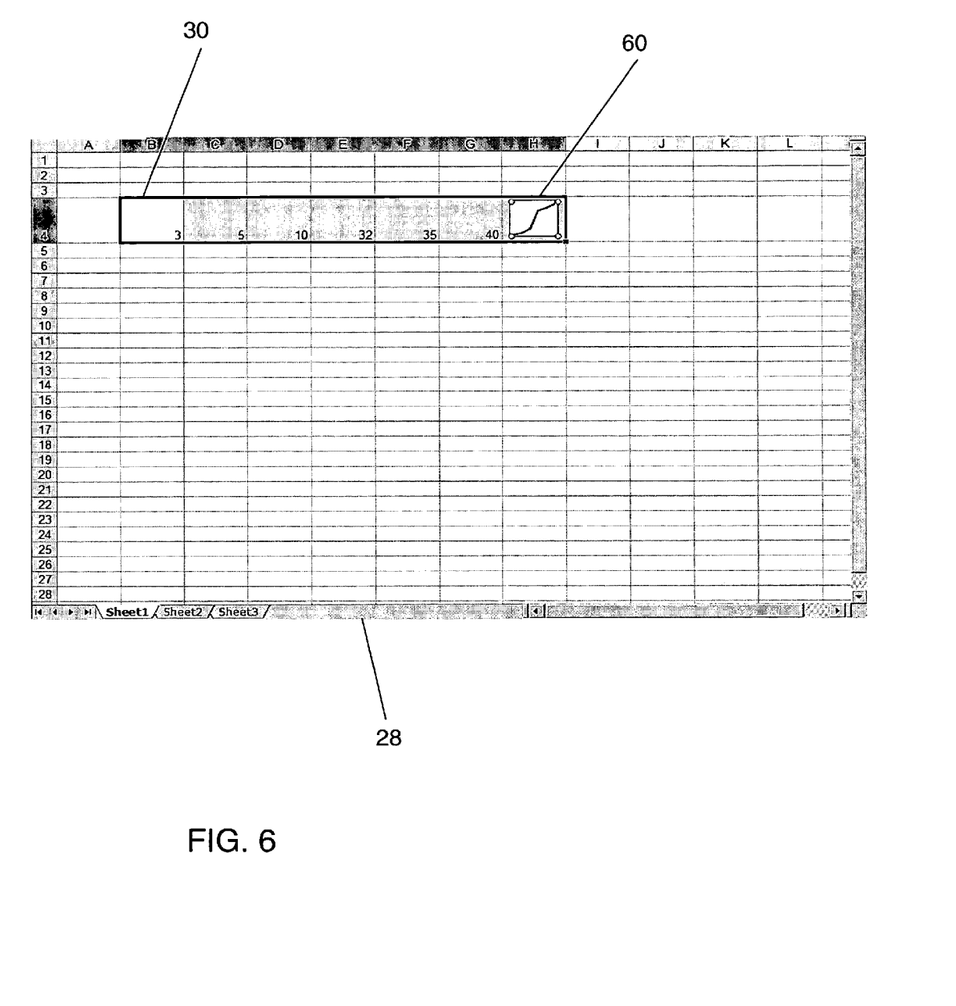
FIG. 6 illustrates a spreadsheet wherein the end of the row of data from FIG. 1 includes a plot as an object in a cell at the end of the row.

FIG. 6 illustrates a spreadsheet 28 wherein the data in the row 30 is plotted into a selected cell 60. The cell 60 is shown at the end of the row 30, but can be placed in any selected cell. The plot 60 is the output of a calculation over the set of data in row 30. In this way, it is similar to the results of a summation, but just visualized differently. Instead of one number, it is an image of the change of that number over time. If the spreadsheet 28 treated images as first class objects, the plot 60 is the results that would be put into the cell at the end of the row 30 (or column). Some visual representation is provided within the viewed spreadsheet, but is contained as a meaningful image within a cell that doesn't distract from or hide the existing data with which one is working. The plot 60 may then be clicked on, or rolled over, to reveal the full-size plot, similar to the one shown in FIG. 4. Images may be used as input to functions. The outputs of these functions are other images or plots. For example, researchers might analyze images to calculate the size of an area and how it changes over time. Placing these images in a visual spreadsheet, the analysis is run on the row of images and a plot of the results appears at the end of the row.

Figure 7:
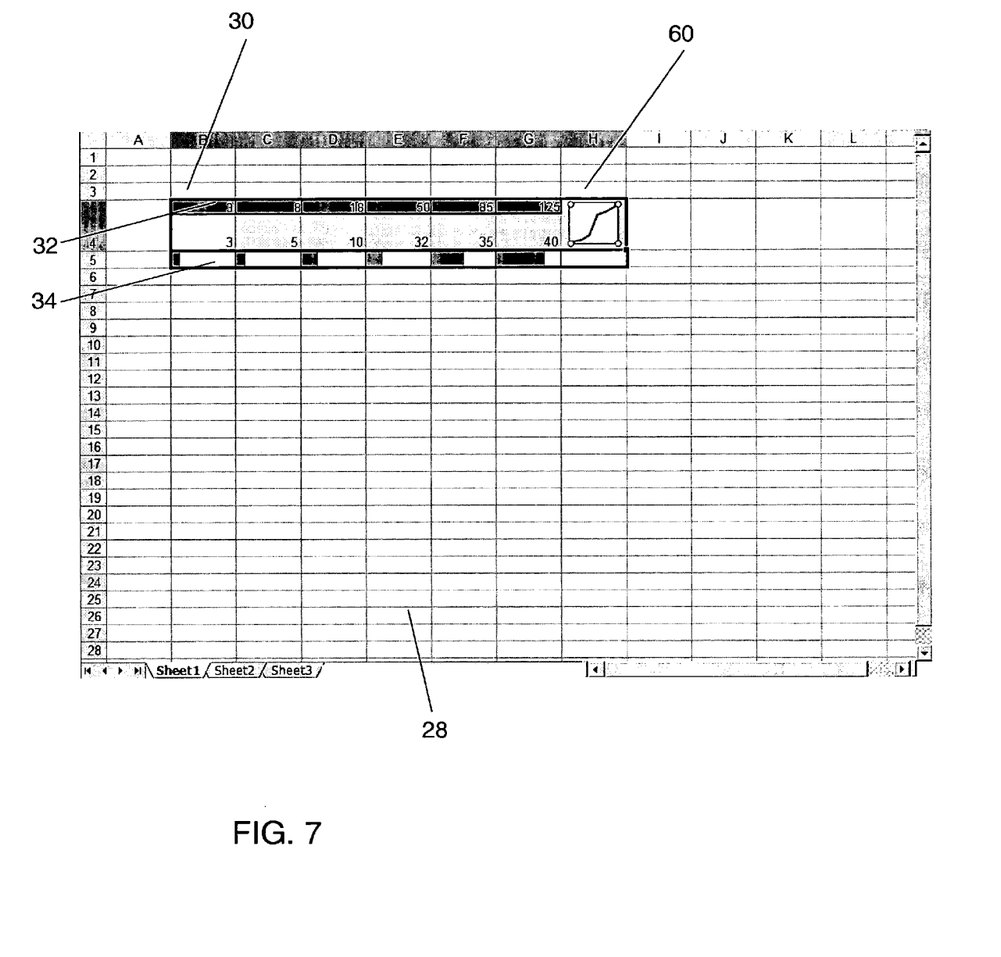
FIG. 7 illustrates a spreadsheet from FIG. 6 with additional summary information displayed.

FIG. 7 shows the same plot 60 at the end of row 30. In addition, summary information as numeric 32 or graphic data 34 can be displayed over or adjacent to the original cell. This is particularly relevant when the cells represent time-based data. Each data cell may have snapshot information of an applied transformation/calculation visually represented as a graphical or alphanumeric device either over or adjacent to the associated data cell.

Figure 8:
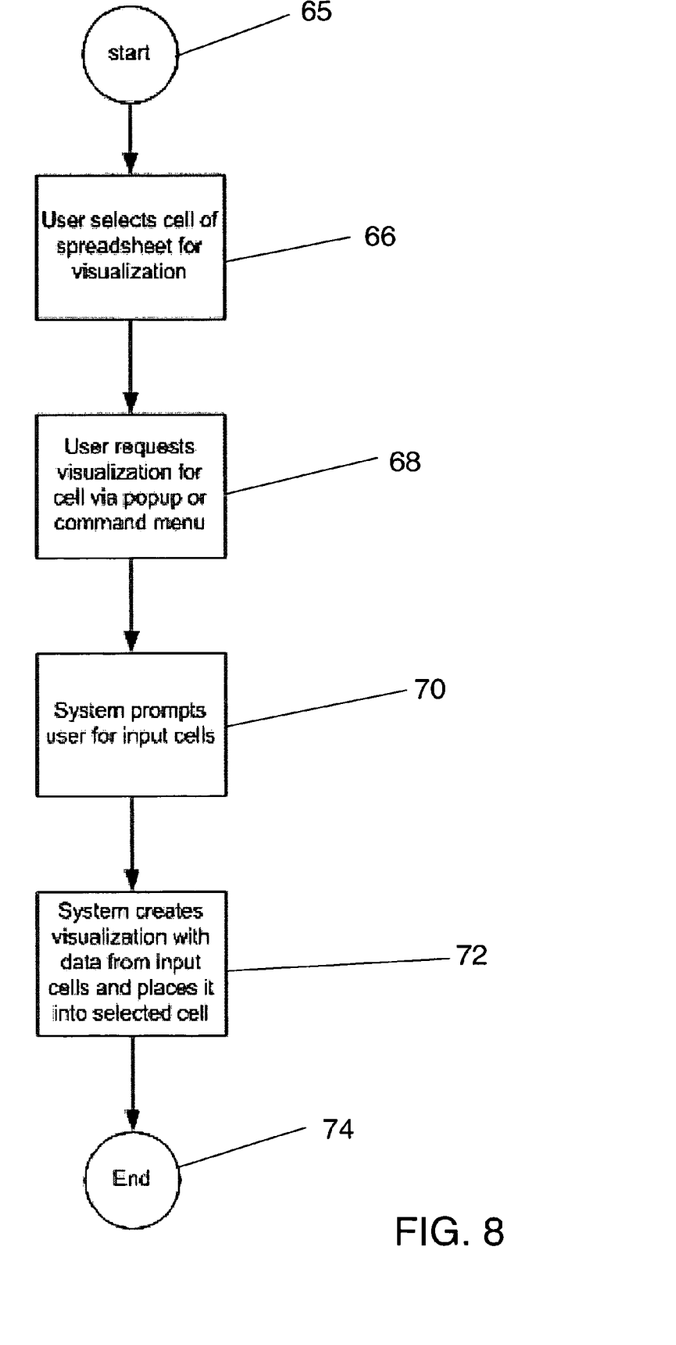
FIG. 8 is a flowchart of the present invention for the visualization module of FIG. 5.
Figure 9:
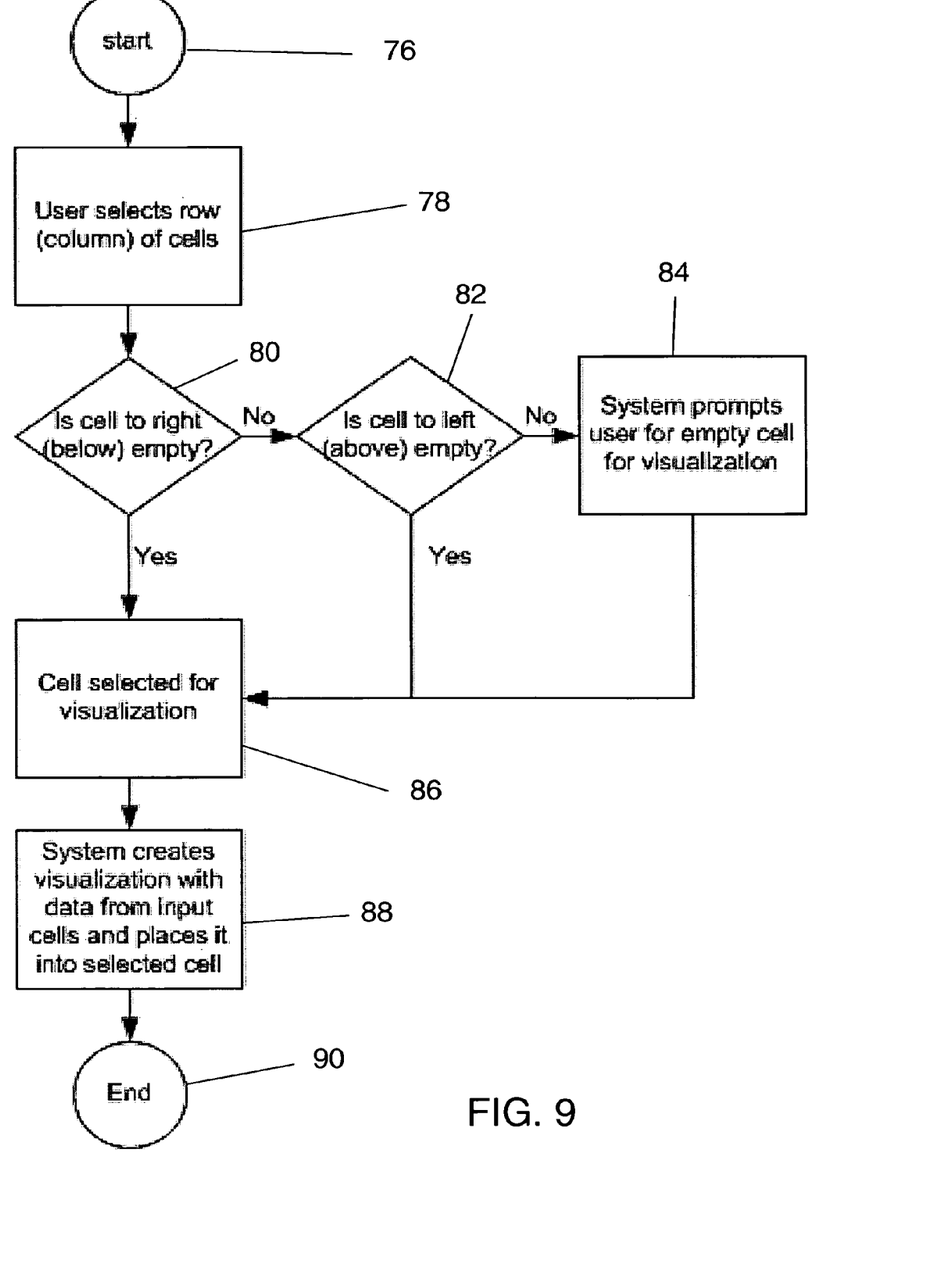
FIG. 9 is a flowchart of another embodiment for the visualization module of FIG. 5.

There are two cases for the selection of calls containing summary information. FIG. 8 illustrates the user selection of the cell for visualization, and FIG. 9 illustrates the automatic selection of the cell for the summary graph. When the user does the selection as in FIG. 8, the selection may be any random cell in the spreadsheet. For the automatic selection of FIG. 9, typically the routine of FIG. 9 picks a cell close to the sequence, (proximate) such that the cell is visually related to the sequence. Alternately, a number of sequences are processed, and summary cells are placed together and coded, such as by color, to associate the summary cells with the sequence each summary cell represents.

FIG. 8 is a flowchart of the visualization module 50 and starts at 65. At 66, the user selects a cell of the spreadsheet for visualization. At 68, the user requests visualization for the cell via a popup or command menu. At 70, the system prompts user for input cells. At 72, the system creates a visualization with data from input cells, and places the visualization into the selected cell. The routine ends at end 74.

FIG. 9 is a flowchart of another embodiment of the visualization module 50 wherein a row or column of cells is selected first. The routine starts at 76, and at 78, the user selects a row or column of cells. A check is made at 80 to determine if the cell to the right of the row, or below the column is empty. If no, a check at 82 determines if the cell to the left of the row or above the column is empty. If the check at 82 is no, the system prompts the user to enter an empty cell for the visualization. If the results of the check at 80 or 82 is yes, or if an empty cell is selected at 84, the cell is selected for visualization at 86. At 88, the system creates a visualization with data from the input cells, and places the visualization into the selected cell. The routine ends at 90. Typically, right and left are associated with rows and above and below are associated with columns. This happens when working with data in a row format or column format, not usually at the same time.

Although the embodiment disclosed is spreadsheet specific, it will be understood that the invention may be used with any other tabular forms of data, and is not limited to spreadsheet applications alone.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An apparatus for providing dynamic visual representation of tabular data, the apparatus comprising:
   a computer having an application containing tabular data in multiple cells;
   a routine in said application for selecting a range of cells of said tabular data;
   a routine within said application for recognizing a request from a user for a graphical summary of said selected range of cells; and
   a routine within said application for providing a graphical plot in a summary cell in said tabular data representative of a summary of said selected range responsive to said request from said user, the graphical plot in said summary cell being of similar size to the cells of said tabular data and placed in a cell by said user or a placement routine so as to not obscure any of the cells of tabular data.

2. The apparatus of claim 1 wherein said application provides a popup or command menu for receiving requests for a graphical summary.

3. The apparatus according to claim 1 wherein said tabular data is a spreadsheet having cells arranged in rows and columns.

4. The apparatus according to claim 3 wherein said selected range of cells is a row of cells in said spreadsheet, and said summary cell is placed by said placement routine proximate said row.

5. The apparatus according to claim 3 wherein said selected range of cells is a column of cells in said spreadsheet, and said summary cell is placed by said placement routine proximate said column.

6. The apparatus according to claim 1 wherein said summary cell is associated with said selected range of cells by location, color or a graphic property.

7. A method for providing dynamic visual representation of tabular data, the method comprising:
   providing a computer readable application containing tabular data in multiple cells;
   selecting a range of cells of said tabular data;
   recognizing a request from a user for a graphical summary to be provided for said selected range of cells; and
   responsive to said request from the user, displaying a graphical plot in a summary cell in said tabular data representative of a summary of said selected range of cells, the graphical plot in said summary cell being of similar size to the cells of said tabular data and placed in a cell by said user or a placement routine so as to not obscure any of the cells of tabular data.

8. The method according to claim 7 further comprising providing a popup or command menu for receiving requests for a graphical summary.

9. The method according to claim 7 wherein said tabular data is a spreadsheet having cells arranged in row and columns.

10. The method according to claim 9 wherein said selected range of cells is a row and further comprising placing by said placement routine, said summary cell proximate said row.

11. The method according to claim 9 wherein said selected range of cells is a column and further comprising placing by said placement routine, said summary cell proximate said column.

12. The method according to claim 7 further comprising associating said summary cell with said selected range of cells by location, color or a graphical property.

13. A program product usable with a system for providing dynamic visual cells in a spreadsheet having cells arranged in rows and columns, the program product comprising:
   a computer readable medium having recorded thereon computer readable program code performing the method comprising:
   providing in an application to be executed on a computer, tabular data in multiple cells;
   selecting by an routine in said application, a range of cells of said tabular data;
   recognizing by a routine in said application, a request from a user for a graphical summary to be provided for said selected range of cells; and
   responsive to said request from said user, displaying by a routine in said application, a graphical plot in a summary cell in said tabular data representative of a summary of said selected range, the graphical plot in said summary cell being of similar size to the cells of said tabular data and placed in a cell by said user or a placement routine so as to not obscure any of the cells of tabular data.

14. The program product according to claim 13 wherein said method further comprises providing a popup or command menu for receiving requests for a graphical summary.

15. The program product according to claim 13 wherein said tabular data is a spreadsheet having cells arranged in row and columns.

16. The program product according to claim 15 wherein said selected range of cells is a row, and said method further comprises placing by said placement routine, said summary cell proximate said row.

17. The program product according to claim 15 wherein said selected range of cells is a column, and said method further comprises placing by said placement routine, said summary cell proximate said column.

18. The program product according to claim 13 wherein said method further comprises associating said summary cell with said selected range of cells by location, color or a graphical property.

* * * * *